(12) United States Patent
Bailey et al.

(10) Patent No.: US 12,330,341 B2
(45) Date of Patent: Jun. 17, 2025

(54) RECYCLED ASPHALT PELLET WITH REDUCED AIRBORNE FIBERGLASS

(71) Applicant: CERTAINTEED LLC, Malvern, PA (US)

(72) Inventors: William R. Bailey, Tumwater, WA (US); William P. Dempsey, Issaquah, WA (US)

(73) Assignee: CERTAINTEED LLC, Malvern, PA (US)

( * ) Notice: Subject to any disclaimer, the term of this patent is extended or adjusted under 35 U.S.C. 154(b) by 0 days.

(21) Appl. No.: 18/421,541

(22) Filed: Jan. 24, 2024

(65) Prior Publication Data

US 2025/0026046 A1   Jan. 23, 2025

Related U.S. Application Data

(60) Provisional application No. 63/514,491, filed on Jul. 19, 2023.

(51) Int. Cl.
*B29B 17/00*   (2006.01)
*B29K 95/00*   (2006.01)
*B29K 105/26*   (2006.01)
*C04B 18/02*   (2006.01)

(52) U.S. Cl.
CPC .... *B29B 17/0036* (2013.01); *B29B 2017/001* (2013.01); *B29K 2095/00* (2013.01); *B29K 2105/26* (2013.01); *C04B 18/02* (2013.01)

(58) Field of Classification Search
CPC ....... C04B 18/00; C04B 18/02; B29B 17/001; B29B 17/0036; B29K 2095/00; B29K 2105/26
See application file for complete search history.

(56) References Cited

U.S. PATENT DOCUMENTS

| | | |
|---|---|---|
| 8,277,881 B2 | 10/2012 | Khan et al. |
| 8,822,594 B2 | 9/2014 | Yakulis et al. |
| 10,030,338 B2 | 7/2018 | Dempsey et al. |

(Continued)

FOREIGN PATENT DOCUMENTS

| | | |
|---|---|---|
| JP | 6531022 B2 | 6/2019 |
| WO | 9937724 A1 | 7/1999 |
| WO | 2011139698 A1 | 4/2011 |

OTHER PUBLICATIONS

"What is PG system?" by California Department of Transportation Available at https://dot.ca.gov/-/media/dot-media/programs/maintenance/documents/pgb-faq-a11y.pdf.Wayback Machine dated to Oct. 2020. (Year: 2020), 2 pages.

*Primary Examiner* — Prem C Singh
*Assistant Examiner* — Brandi M Doyle
(74) *Attorney, Agent, or Firm* — Abel Schillinger, LLP; Stephen Eland

(57) ABSTRACT

According to one aspect, a recycled asphalt shingle pellet can include a core including a recycled asphalt shingle waste and a softening agent; and a shell including no greater than 5% recycled asphalt shingle waste. The recycled asphalt shingle pellets can be a part of a batch of recycled asphalt shingle pellets having a large fiberglass sieve factor, $F_L$, of at least 98.2 wt. %. The batch can also have a small fiberglass sieve factor, $F_s$, of at least 99.1 wt. %.

20 Claims, 1 Drawing Sheet

(56) References Cited

U.S. PATENT DOCUMENTS

| | | |
|---|---|---|
| 10,190,265 B2 | 1/2019 | Dempsey et al. |
| 10,196,783 B2 | 2/2019 | Dempsey et al. |
| 10,513,598 B2 | 12/2019 | Ni et al. |
| 2005/0139126 A1 | 6/2005 | Khan et al. |
| 2005/0145139 A1 | 7/2005 | Khan et al. |
| 2006/0273290 A1 | 12/2006 | Khan et al. |
| 2010/0056669 A1* | 3/2010 | Bailey ................... B29B 9/12 427/180 |
| 2011/0233105 A1 | 9/2011 | Bailey |
| 2015/0252534 A1* | 9/2015 | Dempsey ............ E01C 19/1004 427/222 |

\* cited by examiner

RECYCLED ASPHALT PELLET WITH REDUCED AIRBORNE FIBERGLASS

CROSS-REFERENCE TO RELATED APPLICATION(S)

This Application claims priority under 35 U.S.C. § 119 (c) to U.S. Provisional Patent Application No. 63/514,491, entitled "RECYCLED ASPHALT PELLET WITH REDUCED AIRBORNE FIBERGLASS," filed Jul. 19, 2023, by William R. BAILEY et al., which is assigned to the current assignee hereof and is incorporated herein by reference in its entirety.

FIELD OF THE DISCLOSURE

The following is directed to asphalt pellet compositions containing recycled asphalt shingles.

SUMMARY

According to one aspect, a recycled asphalt shingle pellet can include a core including recycled asphalt shingle waste and a softening agent; and a shell including no greater than 5% recycled asphalt shingle waste. The recycled asphalt shingle pellets can be a part of a batch of recycled asphalt shingle pellets having a large fiberglass sieve factor, $F_L$, of at least 98.2 wt. %. The batch can also have a small fiberglass sieve factor, $F_s$, of at least 99.1 wt. %.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is directed to asphalt pellets for pavement compositions including recycled asphalt shingle (RAS) material that provide suitable and improved physical and rheological characteristics and improved workability. The asphalt pellets are storage stable and release a significantly reduced amount of airborne fiberglass during product and processing as compared to other RAS containing compositions.

Figure 1:
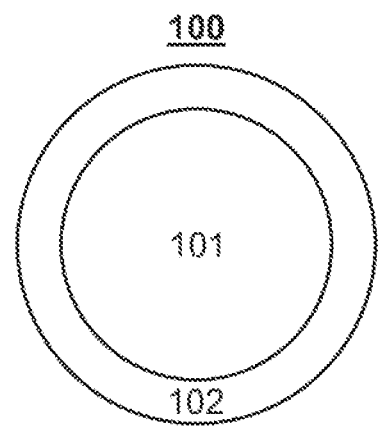
FIG. 1 includes an illustration of a pellet according to an embodiment.

FIG. 1 includes an illustration of a pellet 100 according to an embodiment. The pellet 100 can have a core 101 and a shell 102. The pellets are suitable for various storage and transportation conditions.

Figure 2:
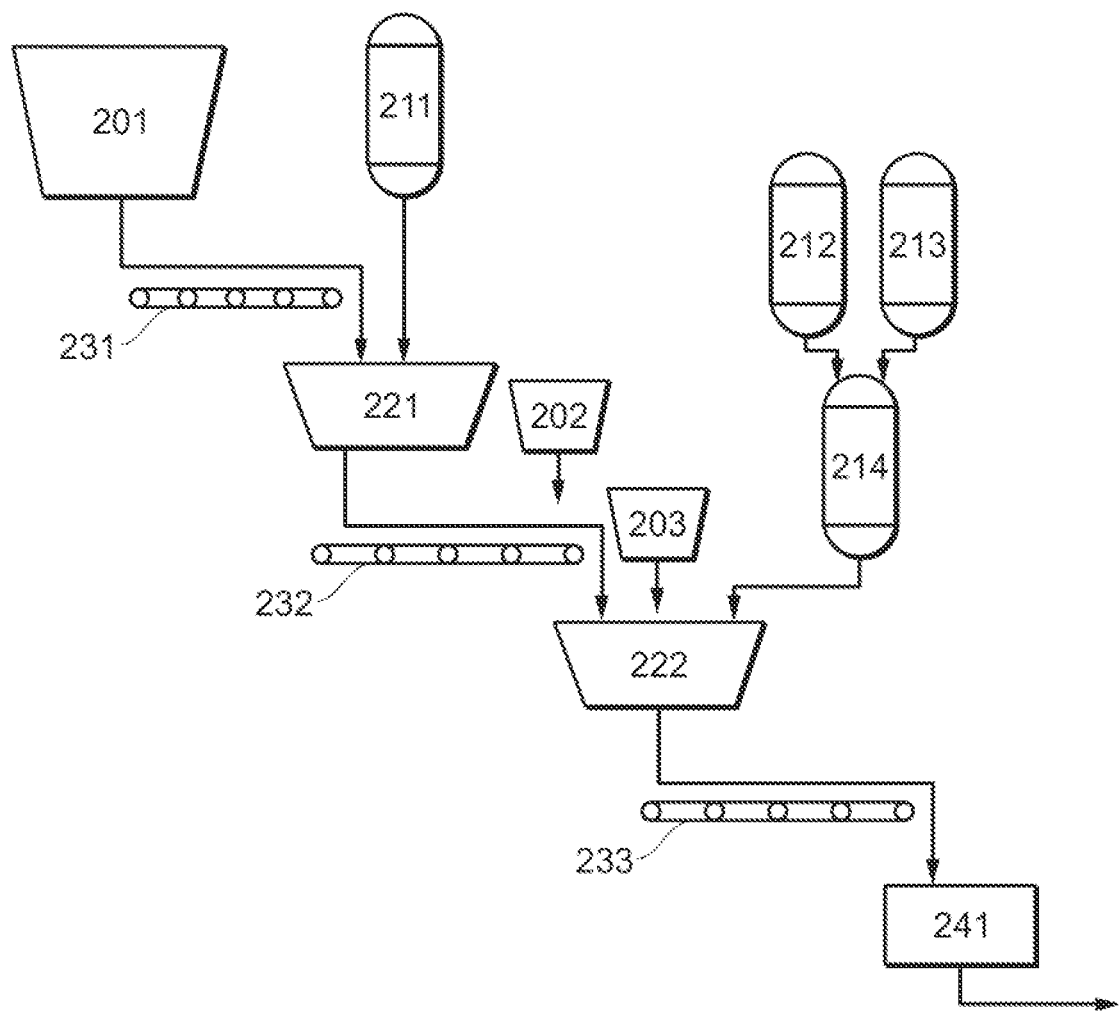
FIG. 2 includes an illustration of an exemplary system for forming asphalt pellets according to an embodiment.

FIG. 2 includes an illustration of an exemplary system for forming pellets according to an embodiment. The system begins with RAS hopper 201. RAS from RAS hopper 201 can be transported via conveyor belt 231 to pelletizer disc 221. The RAS can be agglomerated or pelletized with a softening agent from tank 211 to form pellet cores 101. The cores can have a diameter between 0.25 and 0.5 inches. Alternatively, the cores can have a maximum diameter of 0.75 inches or 1 inch.

In an embodiment, the RAS can include post-industrial waste, post-consumer waste, or a combination thereof. The RAS can be in a size from about 20-40 mesh to about 0.25 inches.

In an embodiment, the cores 101 may include a particular amount of RAS waste that may facilitate improved performance and/or manufacturing of the asphalt pellets. In an embodiment, the core can include at least 5 wt. % recycled asphalt shingle waste or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % recycled asphalt shingle waste. In another embodiment, the core can include no greater than 99 wt. % recycled asphalt shingle waste or no greater than 98 wt. % or no greater than 97 wt. % or no greater than 96 wt. % or no greater than 95 wt. % recycled asphalt shingle waste. It will be appreciated that the core can include a range of recycled asphalt shingle waste between any of the minimum and maximum values noted above, including for example, at least 10 w % and not greater than 99 wt. % or at least 90 wt. % and not greater than 96 wt. %.

In an embodiment, the cores 101 may include a particular amount of softening agent that may facilitate improved performance and/or manufacturing of the asphalt pellets. In an embodiment, the core can include at least 5 wt. % recycled asphalt shingle waste or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % recycled asphalt shingle waste. In another embodiment, the core can include no greater than 99 wt. % recycled asphalt shingle waste or no greater than 98 wt. % or no greater than 97 wt. % or no greater than 96 wt. % or no greater than 95 wt. % recycled asphalt shingle waste. It will be appreciated that the core can include a range of recycled asphalt shingle waste between any of the minimum and maximum values noted above, including for example, at least 10 w % and not greater than 99 wt. % or at least 90 wt. % and not greater than 96 wt. %.

In an embodiment, the cores 101 may include a particular amount of softening agent that may facilitate improved performance and/or manufacturing of the asphalt pellets. In an embodiment, the core can include at least 1 wt. % softening agent or at least 2 wt. % or at least 3 wt. % or at least 4 wt. % or at least 5 wt. % softening agent. In another embodiment, the core can include no greater than 30 wt. % softening agent or no greater than 25 wt. % or no greater than 20 wt. % or no greater than 15 wt. % or no greater than 10 wt. %. It will be appreciated that the core can include a range of softening agents between any of the minimum and maximum values noted above, including for example, at least 1 wt. % and not greater than 10 wt. % or at least 5 wt. % and not greater than 10 wt. %.

In an embodiment, the softening agent can have a particular composition that may facilitate improved performance and/or manufacturing of the asphalt pellets. In an embodiment, the softening agent can a petrolium distillate, a Fischer-Tropsch wax, soy wax, zeolites, high density polyethylene (HDPE), low density polyethylene (LDPE), ethylene-vinyl acetate (EVA), polyvinyl chloride (PVC), an emulsifying agent, recycled asphalt pavement, performance grade asphalt, bio-oil, a vegetable oil, biofuel, a biodiesel, Tall-oil, heavy vacuum gas oil (HVGO), fatty acid methyl esters (FAME), reclaimed motor oil, reclaimed cutting oil, pine tar, a biodiesel residue oil, or a combination thereof. In a particular embodiment, the softening agent can include biodiesel residue oil.

In an embodiment, the core can comprise an additive. The additive can have a particular composition that may facilitate improved performance and/or manufacturing of the asphalt pellets. The additive composition may also provide for reduced environmental impact. In an embodiment, the additive can comprise tire rubber, asphalt, aramid fibers, carbon, asphalt additives, glass, recycled material, recycled asphalt pavement, Fischer-Tropsch wax, soy wax, zeolites, high-density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, comprises carbon black, a colorant, cellulose, or a combination thereof.

Following pelletizer disc 221, the cores 101 can be transported to pelletizer disc 222 via conveyor belt 232. The pellets can be dusted with mineral fines from hopper 202. Then the cores are agglomerated with a shell composition in pelletizer disc 222 to form a shell 102 over cores 101. The shelled pellets can have a diameter of at least 0.01 in. or at least 0.5 in. and no greater than 2 in. or no greater than 1 in. The shelled pellets can comprise 80-90 wt. % core and 10-20 wt. % shell. In an alternative embodiment, the cores can be agglomerated with the shell composition in the same pelletizer disc used to form the cores.

In an embodiment, the shell composition may have a particular composition that may facilitate improved performance and/or manufacturing of the asphalt pellets. In an embodiment, the shell composition can include recycled polyethylene, a water-resistant polymer, a wax, mineral fines, or ground plastic fines. In a more particular embodiment, the shell composition can include mineral fines. In an even more particular embodiment, the shell composition can include lime fines. In an even more particular composition, the shell can include hydrated lime. These materials can be deposited into pelletizer disc 222 via hopper 203.

In an embodiment, the shell composition may include a particular content of mineral fines that may facilitate improved performance and/or manufacturing of the asphalt pellets. In an embodiment, the shell can include at least 50 wt. % mineral fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % mineral fines. In an embodiment, the shell can include less than 99.99 wt. % mineral fines or less than 99 wt. % mineral fines. It will be appreciated that the mineral fines content can be between any of the minimum and maximum values noted above, including for example, but not limited to, at least 80 wt. % and not greater than 99.99 wt. % or at least 95 wt. % and no greater than 99.99 wt. %.

In an embodiment, the shell composition may include a particular content of lime fines that may facilitate improved performance and/or manufacturing of the asphalt pellets. In an embodiment, the shell can include at least 50 wt. % lime fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % lime fines. In an embodiment, the shell can include less than 99.99 wt. % lime fines or less than 99 wt. % lime fines. It will be appreciated that the lime fines content can be between any of the minimum and maximum values noted above, including for example, but not limited to, at least 80 wt. % and not greater than 99.99 wt. % or at least 95 wt. % and no greater than 99.99 wt. %.

In an embodiment, the shell composition may include a particular content of hydrated lime that may facilitate improved performance and/or manufacturing of the asphalt pellets. In an embodiment, the shell can include at least 50 wt. % hydrated lime or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % hydrated lime. In an embodiment, the shell can include less than 99.99 wt. % hydrated lime or less than 99 wt. % hydrated lime. It will be appreciated that the hydrated lime content can be between any of the minimum and maximum values noted above, including for example, but not limited to, at least 80 wt. % and not greater than 99.99 wt. % or at least 95 wt. % and no greater than 99.99 wt. %.

In an embodiment, the shell composition can further include lignin and a water-resistant agent. The lignin and water-resistant agent can be fed from tanks 212 and 213 to be mixed with water in tank 214. The lignin and water-resistant agent solution can then be fed into pelletizer disc 222 to be agglomerated as part of the shell composition. In an alternative embodiment, the shell can include a hydrophobic polymer, a hydrophilic polymer, a hydrophobic cellulose, a polyvinyl alcohol, molasses or molasses derivatives, latex, polysaccharides, or latex.

In an embodiment, the shell composition can further include an additive that may facilitate improved performance and/or manufacturing of the asphalt pellet. The additive may also provide for reduced environmental impact. In an embodiment, the additive can be tire rubber, asphalt, aramid fibers, carbon, asphalt additives, glass, recycled material, recycled asphalt pavement, Fischer-Tropsch wax, soy wax, zeolites, high density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, carbon black, a colorant, cellulose, or a combination thereof.

In an embodiment, the shell composition may include a particular content of recycled asphalt shingles that may facilitate improved performance and/or manufacturing of the asphalt pellets. In an embodiment, the shell composition may include no greater than 5 wt. % recycled asphalt shingle waste or less than 4 wt. % recycled asphalt shingle waste or less than 3 wt. % or less than 2 wt. % or less than 1 wt. %. In an embodiment, the shell composition can be essentially free of recycled asphalt shingle waste.

Following pelletizer disc 222, the shelled pellets 100 can be transported to dryer 241 via conveyor belt 233. The pellets can be dried at a temperature of 120-160° F. The pellets can be dried until essentially all water in the shell has evaporated.

In an embodiment, the pellets can have a particular large fiberglass sieve factor, $F_L$, which may facilitate improved performance and/or manufacturing of the pellets. In an embodiment, the batch can have an $F_L$ of at least 98.2 wt. % or at least 98.3 wt. % or at least 98.4 wt. % or at least 98.5 wt. % or at least 98.6 wt. % or at least 98.7 wt. % or at least 98.8 wt. % or at least 98.9 wt. % or at least 99.0 wt. % or at least 99.1 wt. % or at least 99.2 wt. % or at least 99.3 wt. % or at least 99.4 wt. % or at least 99.5 wt. %. In an embodiment, the batch can have an $F_L$ of no greater than 99.99 wt. %. It will be appreciated that $F_L$ may be within a range having any of the minimum and maximum values noted above.

In an embodiment, the pellets can have a particular small fiberglass sieve factor, $F_S$, which may facilitate improved performance and/or manufacturing of the pellets. In an embodiment, the batch can have an $F_S$ of at least 99.1 wt. % or at least 99.2 wt. % or at least 99.3 wt. % or at least 99.4 wt. % or at least 99.5 wt. % or at least 99.6 wt. % or at least 99.7 wt. %. In an embodiment, the batch can have an $F_S$ of no greater than 99.99 wt. %. It will be appreciated that $F_S$ may be within a range having any of the minimum and maximum values noted above.

The large and small fiberglass sieve factors can be measured according to the methods outlined in the examples section below.

In an embodiment, the pellets have a particular low temperature performance grade that may facilitate improved performance and/or manufacturing of the asphalt pellets. In an embodiment, the pellets can have a low temperature performance grade of no greater than 0° C. or no greater than −2° C. or no greater than −4° C. or no greater than −6° C. or no greater than −8° C. or no greater than −10° C. or no greater than −12° C. or no greater than −14° C. or no greater than −16° C. or no greater than −18° C. or no greater than −20° C. or no greater than −22° C. or no greater than −24° C. or no greater than −26° C. In another embodiment, the pellets can have a low temperature performance grade of at least −50° C. In other words, the low temperature performance grade is-50 or greater. It will be appreciated that the low temperature performance grade may be between any of the minimum and maximum values noted above.

In an embodiment, the pellets have a particular high temperature performance grade that may facilitate improved performance and/or manufacturing of the asphalt pellets. In an embodiment, the pellets can have a high temperature performance grade of at least 50° C. or at least 52° C. or at least 54° C. or at least 56° C. or at least 58° C. or at least 60° C. or at least 62° C. or at least 64° C. or at least 66° C. or at least 68° C. or at least 70° C. or at least 72° C. or at least 74° C. or at least 76° C. or at least 78° C. or at least 80° C. In another embodiment, the pellets can have a high temperature performance grade of less than 120° C. It will be appreciated that the high temperature performance grade may be between any of the minimum and maximum values noted above.

Pavement grading is conducted in accordance with AASHTO R29 and AASHTO M320. The pavement grade is a characteristic of the asphalt within the pellets. The low temperature and high temperature performance grades are indicative of the lowest and highest temperatures at which the asphalt compositions can perform as pavement in low traffic conditions without failure.

Embodiments

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1. A batch of recycled asphalt shingle pellets, each pellet comprising:
  a core comprising a recycled asphalt shingle waste and a softening agent;
  a shell comprising no greater than 5% recycled asphalt shingle waste;
  wherein the batch comprises a large fiberglass sieve factor, FL, of at least 98.2 wt. %.

Embodiment 2. A batch of recycled asphalt shingle pellets, each pellet comprising:
  a core comprising a recycled asphalt shingle waste and a softening agent;
  a shell comprising no greater than 5% recycled asphalt shingle waste;
  wherein the batch comprises a small fiberglass sieve factor, Fs, of at least 99.1 wt. %.

Embodiment 3. The batch of embodiment 2, wherein the batch comprises a FL of at least 98.2 wt. %.

Embodiment 4. The batch of embodiment 1 or embodiment 2, wherein the batch comprises a FL of at least 98.3 wt. % or at least 98.4 wt. % or at least 98.5 wt. % or at least 98.6 wt. % or at least 98.7 wt. % or at least 98.8 wt. % or at least 98.9 wt. % or at least 99.0 wt. % or at least 99.1 wt. % or at least 99.2 wt. % or at least 99.3 wt. % or at least 99.4 wt. % or at least 99.5 wt. %.

Embodiment 5. The batch of embodiment 1 or embodiment 2, wherein the batch comprises a FL of no greater than 99.99 wt. %.

Embodiment 6. The batch of embodiment 1 or embodiment 2, wherein the batch comprises a FS of at least 99.1 wt. % or at least 99.2 wt. % or at least 99.3 wt. % or at least 99.4 wt. % or at least 99.5 wt. % or at least 99.6 wt. % or at least 99.7 wt. %.

Embodiment 7. The batch of embodiment 1 or embodiment 2, wherein the batch comprises a FS of no greater than 99.99 wt. %.

Embodiment 8. The batch of embodiment 1 or embodiment 2, wherein the batch comprises a low temperature performance grade of no greater than 0° C. or no greater than −2° C. or no greater than −4° C. or no greater than −6° C. or no greater than −8° C. or no greater than −10° C. or no greater than −12° C. or no greater than −14° C. or no greater than −16° C. or no greater than −18° C. or no greater than −20° C. or no greater than −22° C. or no greater than −24° C. or no greater than −26° C.

Embodiment 9. The batch of embodiment 1 or embodiment 2, wherein the batch comprises a low temperature performance grade of at least −50° C.

Embodiment 10. The batch of embodiment 1 or embodiment 2, wherein the batch comprises a high temperature performance grade of at least 50° C. or at least 52° C. or at least 54° C. or at least 56° C. or at least 58° C. or at least 60° C. or at least 62° C. or at least 64° C. or at least 66° C. or at least 68° C. or at least 70° C. or at least 72° C. or at least 74° C. or at least 76° C. or at least 78° C. or at least 80° C.

Embodiment 11. The batch of embodiment 1 or embodiment 2, wherein the batch comprises a high temperature performance grade of less than 120° C.

Embodiment 12. The batch of embodiment 1 or embodiment 2, wherein the recycled asphalt shingle waste comprises post consumer waste, post industrial waste, or a combination thereof.

Embodiment 13. The batch of embodiment 1 or embodiment 2, wherein the core comprises at least 5 wt. % recycled asphalt shingle waste or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % recycled asphalt shingle waste.

Embodiment 14. The batch of embodiment 1 or embodiment 2, wherein the core comprises no greater than 99 wt. % recycled asphalt shingle waste or no greater than 98 wt. % or no greater than 97 wt. % or no greater than 96 wt. % or no greater than 95 wt. % recycled asphalt shingle waste.

Embodiment 15. The batch of embodiment 1 or embodiment 2, wherein the core comprises at least 1 wt. % softening agent or at least 2 wt. % or at least 3 wt. % or at least 4 wt. % or at least 5 wt. % softening agent.

Embodiment 16. The batch of embodiment 1 or embodiment 2, wherein the core comprises no than 30 wt. % softening agent or no greater than 25 wt. % or no greater than 20 wt. % or no greater than 15 wt. % or no greater than 10 wt. %.

Embodiment 17. The batch of embodiment 1 or embodiment 2, wherein the softening agent comprises a petroleum distillate, a Fischer-Tropsch wax, soy wax, zeolites, HDPE, LDPE, EVA, PVC, an emulsifying agent, recycled asphalt pavement, performance grade asphalt, bio-oil, a vegetable oil, biofuel, a biodiesel, Tall-oil, HVGO, FAME, reembodimented motor oil, reembodimented cutting oil, pine tar, a biodiesel residue oil, or a combination thereof.

Embodiment 18. The batch of embodiment 1 or embodiment 2, wherein the softening agent comprises a biodiesel residue oil.

Embodiment 19. The batch of embodiment 1 or embodiment 2, wherein the core further comprises an additive.

Embodiment 20. The batch of embodiment 17, wherein the additive comprises tire rubber, asphalt, aramid fibers, carbon, asphalt additives, glass, recycled material, recycled asphalt pavement, Fischer-Tropsch wax, soy wax, zeolites, high density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, carbon black, a colorant, cellulose, or a combination thereof.

Embodiment 21. The batch of embodiment 1 or embodiment 2, wherein the core comprises a diameter of at least 0.01 in. or at least 0.25 in. and no greater than 2 in. or no greater than 1 in. or no greater than 0.75 in. or no greater than 0.5 in.

Embodiment 22. The batch of embodiment 1 or embodiment 2, wherein the pellet comprises a diameter of at least 0.01 in. or at least 0.5 in. and no greater than 2 in or no greater than 1 in.

Embodiment 23. The batch of embodiment 1 or embodiment 2, wherein the shell comprises less than 4 wt. % recycled asphalt shingle waste or less than 3 wt. % or less than 2 wt. % or less than 1 wt. %.

Embodiment 24. The batch of embodiment 1 or embodiment 2, wherein the shell is essentially free of recycled asphalt shingle waste.

Embodiment 25. The batch of embodiment 1 or embodiment 2, wherein the shell comprises recycled polyethylene, a water-resistant polymer, a wax, mineral fines, or ground plastic fines, or a combination thereof.

Embodiment 26. The batch of embodiment 1 or embodiment 2, wherein the shell comprises mineral fines.

Embodiment 27. The batch of embodiment 1 or embodiment 2, wherein the shell comprises lime fines.

Embodiment 28. The batch of embodiment 1 or embodiment 2, wherein the shell comprises hydrated lime.

Embodiment 29. The batch of embodiment 1 or embodiment 2, wherein the shell comprises at least 50 wt. % mineral fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % mineral fines.

Embodiment 30. The batch of embodiment 1 or embodiment 2, wherein the shell comprises at least 50 wt. % lime fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % lime fines.

Embodiment 31. The batch of embodiment 1 or embodiment 2, wherein the shell comprises at least 50 wt. % hydrated lime or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % hydrated lime.

Embodiment 32. The batch of embodiment 1 or embodiment 2, wherein the shell further comprises a water resistant agent.

Embodiment 33. The batch of embodiment 1 or embodiment 2, wherein the shell further comprises an adhesive.

Embodiment 34. The batch of embodiment 1 or embodiment 2, wherein the shell further comprises lignin.

Embodiment 35. The batch of embodiment 1 or embodiment 2, wherein the shell further comprises a hydrophobic polymer, a hydrophilic polymer, a hydrophobic cellulose, a polyvinyl alcohol, molasses or molasses derivatives, latex, polysaccharides, or latex, or any combination thereof.

Embodiment 36. The batch of embodiment 1 or embodiment 2, wherein the shell further comprises a shell additive.

Embodiment 37. The batch of embodiment 36, wherein the shell additive comprises tire rubber, asphalt, aramid fibers, carbon, asphalt additives, glass, recycled material, recycled asphalt pavement, Fischer-Tropsch wax, soy wax, zeolites, high density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, carbon black, a colorant, cellulose, or a combination thereof.

Embodiment 38. The batch of embodiment 1 or embodiment 2, wherein the shell comprises 10-20 wt. % of each pellet.

Embodiment 39. The batch of embodiment 1 or embodiment 2, wherein the core comprises 80-90 wt. % of each pellet.

Embodiment 40. A recycled asphalt shingle pellet comprising:
a core comprising a recycled asphalt shingle waste and a softening agent;
a shell no greater than 5% recycled asphalt shingle waste.

Embodiment 41. The pellet of embodiment 40, wherein the batch comprises a low temperature performance grade of no greater than 0° C. or no greater than −2° C. or no greater than −4° C. or no greater than −6° C. or no greater than −8° C. or no greater than −10° C. or no greater than −12° C. or no greater than −14° C. or no greater than −16° C. or no greater than −18° C. or no greater than −20° C. or no greater than −22° C. or no greater than −24° C. or no greater than −26° C.

Embodiment 42. The pellet of embodiment 40, wherein the batch comprises a low temperature performance grade of at least −50° C.

Embodiment 43. The pellet of embodiment 40, wherein the batch comprises a high temperature performance grade of at least 50° C. or at least 52° C. or at least 54° C. or at least 56° C. or at least 58° C. or at least 60° C. or at least 62° C.

or at least 64° C. or at least 66° C. or at least 68° C. or at least 70° C. or at least 72° C. or at least 74° C. or at least 76° C. or at least 78° C. or at least 80° C.

Embodiment 44. The pellet of embodiment 40, wherein the batch comprises a high temperature performance grade of less than 120° C.

Embodiment 45. The pellet of embodiment 40, wherein the recycled asphalt shingle waste comprises post consumer waste, post industrial waste, or a combination thereof.

Embodiment 46. The pellet of embodiment 40, wherein the core comprises at least 5 wt. % recycled asphalt shingle waste or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % recycled asphalt shingle waste.

Embodiment 47. The pellet of embodiment 40, wherein the core comprises no greater than 99 wt. % recycled asphalt shingle waste or no greater than 98 wt. % or no greater than 97 wt. % or no greater than 96 wt. % or no greater than 95 wt. % recycled asphalt shingle waste.

Embodiment 48. The pellet of embodiment 40, wherein the core comprises at least 1 wt. % softening agent or at least 2 wt. % or at least 3 wt. % or at least 4 wt. % or at least 5 wt. % softening agent.

Embodiment 49. The pellet of embodiment 40, wherein the core comprises no than 30 wt. % softening agent or no greater than 25 wt. % or no greater than 20 wt. % or no greater than 15 wt. % or no greater than 10 wt. %.

Embodiment 50. The pellet of embodiment 40, wherein the softening agent comprises a petroleum distillate, a Fischer-Tropsch wax, soy wax, zeolites, HDPE, LDPE, EVA, PVC, an emulsifying agent, recycled asphalt pavement, performance grade asphalt, bio-oil, a vegetable oil, biofuel, a biodiesel, Tall-oil, HVGO, FAME, reembodimented motor oil, reembodimented cutting oil, pine tar, a biodiesel residue oil, or a combination thereof.

Embodiment 51. The pellet of embodiment 40, wherein the softening agent comprises a biodiesel residue oil.

Embodiment 52. The pellet of embodiment 40, wherein the core comprises a diameter of at least 0.01 in. or at least 0.25 in. and no greater than 2 in. or no greater than 1 in. or no greater than 0.75 in. or no greater than 0.5 in.

Embodiment 53. The pellet of embodiment 40, wherein the pellet comprises a diameter of at least 0.01 in. or at least 0.5 in. and no greater than 2 in or no greater than 1 in.

Embodiment 54. The pellet of embodiment 40, wherein the shell comprises less than 4 wt. % recycled asphalt shingle waste or less than 3 wt. % or less than 2 wt. % or less than 1 wt. %.

Embodiment 55. The pellet of embodiment 40, wherein the shell is essentially free of recycled asphalt shingle waste.

Embodiment 56. The pellet of embodiment 40, wherein the shell comprises recycled polyethylene, a water-resistant polymer, a wax, mineral fines, or ground plastic fines, or a combination thereof.

Embodiment 57. The pellet of embodiment 40, wherein the shell comprises mineral fines.

Embodiment 58. The pellet of embodiment 40, wherein the shell comprises lime fines.

Embodiment 59. The pellet of embodiment 40, wherein the shell comprises hydrated lime.

Embodiment 60. The pellet of embodiment 40, wherein the shell comprises at least 50 wt. % mineral fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % mineral fines.

Embodiment 61. The pellet of embodiment 40, wherein the shell comprises at least 50 wt. % lime fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % lime fines.

Embodiment 62. The pellet of embodiment 40, wherein the shell comprises at least 50 wt. % hydrated lime or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % hydrated lime.

Embodiment 63. The pellet of embodiment 40, wherein the shell further comprises a water resistant agent.

Embodiment 64. The pellet of embodiment 40, wherein the shell further comprises an adhesive.

Embodiment 65. The pellet of embodiment 40, wherein the shell further comprises lignin.

Embodiment 66. The pellet of embodiment 40, wherein the shell further comprises a hydrophobic polymer, a hydrophilic polymer, a hydrophobic cellulose, a polyvinyl alcohol, molasses or molasses derivatives, latex, polysaccharides, or latex, or any combination thereof.

Embodiment 67. The pellet of embodiment 40, wherein the shell further comprises a shell additive.

Embodiment 68. The pellet of embodiment 67, wherein the shell additive comprises tire rubber, asphalt, aramid fibers, carbon, asphalt additives, glass, recycled material, recycled asphalt pavement, Fischer-Tropsch wax, soy wax, zeolites, high density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, carbon black, a colorant, cellulose, or a combination thereof.

Embodiment 69. The pellet of embodiment 40, wherein the shell comprises 10-20 wt. % of each pellet.

Embodiment 70. The pellet of embodiment 40, wherein the core comprises 80-90 wt. % of each pellet.

Embodiment 71. A method of preparing a batch of asphalt pellets comprising:
  agglomerating recycled asphalt shingle material with a softening agent in a pelletizer to form asphalt pellet cores;
  agglomerating the asphalt pellet cores with a shell composition to form asphalt pellets;
  wherein the asphalt pellet shells comprise no greater than 5% recycled asphalt shingle waste.

Embodiment 72. The method of embodiment 71, further comprising dusting the asphalt pellet cores with a mineral powder before agglomerating the asphalt pellet cores with the shell composition.

Embodiment 73. The method of embodiment 71, wherein the shell composition comprises a water resistant agent.

Embodiment 74. The method of embodiment 71, wherein the shell composition comprises an adhesive.

Embodiment 75. The method of embodiment 71, wherein the shell composition comprises lignin.

Embodiment 76. The method of embodiment 71, wherein the shell composition comprises a hydrophobic polymer, a hydrophilic polymer, a hydrophobic cellulose, a polyvinyl alcohol, molasses or molasses derivatives, latex, polysaccharides, or latex, or any combination thereof.

Embodiment 77. The method of embodiment 71, wherein the shell composition comprises a shell additive.

Embodiment 78. The method of embodiment 77, wherein the shell additive comprises tire rubber, asphalt, aramid fibers, carbon, asphalt additives, glass, recycled material, recycled asphalt pavement, Fischer-Tropsch wax, soy wax, zeolites, high density polyethylene (HDPE), low density polyethylene (LDPE), ethylene-vinyl acetate (EVA), polyvinyl chloride (PVC), an emulsifying agent, polycyclic aromatic hydrocarbons (PAHs), sodium polyacrylate polymers, styrene butadiene styrene rubbers (SBS), styrene butadiene rubbers (SBR), paper, carbon black, a colorant, cellulose, or a combination thereof.

Embodiment 79. The method of embodiment 71, wherein the shell composition includes lignin and a water-resistant agent.

Embodiment 80. The method of embodiment 79, further comprising drying the coated pellets.

Embodiment 81. The method of embodiment 79, further comprising drying the coated pellets at a temperature of 120-160° F.

Embodiment 82. The method of embodiment 71, wherein the batch comprises a FL of at least 98.2 wt. % or at least 98.3 wt. % or at least 98.4 wt. % or at least 98.5 wt. % or at least 98.6 wt. % or at least 98.7 wt. % or at least 98.8 wt. % or at least 98.9 wt. % or at least 99.0 wt. % or at least 99.1 wt. % or at least 99.2 wt. % or at least 99.3 wt. % or at least 99.4 wt. % or at least 99.5 wt. %.

Embodiment 83. The method of embodiment 71, wherein the batch comprises a FL of no greater than 99.99 wt. %.

Embodiment 84. The method of embodiment 71, wherein the batch comprises a FS of at least 99.1 wt. % or at least 99.2 wt. % or at least 99.3 wt. % or at least 99.4 wt. % or at least 99.5 wt. % or at least 99.6 wt. % or at least 99.7 wt. %.

Embodiment 85. The method of embodiment 71, wherein the batch comprises a FS of no greater than 99.99 wt. %.

Embodiment 86. The method of embodiment 71, wherein the batch comprises a low temperature performance grade of no greater than 0° C. or no greater than −2° C. or no greater than −4° C. or no greater than −6° C. or no greater than −8° C. or no greater than −10° C. or no greater than −12° C. or no greater than −14° C. or no greater than −16° C. or no greater than −18° C. or no greater than −20° C. or no greater than −22° C. or no greater than −24° C. or no greater than −26° C.

Embodiment 87. The method of embodiment 71, wherein the batch comprises a low temperature performance grade of at least −50° C.

Embodiment 88. The method of embodiment 71, wherein the batch comprises a high temperature performance grade of at least 50° C. or at least 52° C. or at least 54° C. or at least 56° C. or at least 58° C. or at least 60° C. or at least 62° C. or at least 64° C. or at least 66° C. or at least 68° C. or at least 70° C. or at least 72° C. or at least 74° C. or at least 76° C. or at least 78° C. or at least 80° C.

Embodiment 89. The method of embodiment 71, wherein the batch comprises a high temperature performance grade of less than 120° C.

Embodiment 90. The method of embodiment 71, wherein the recycled asphalt shingle material comprises post consumer waste, post industrial waste, or a combination thereof.

Embodiment 91. The method of embodiment 71, wherein the core comprises at least 5 wt. % recycled asphalt shingle waste or at least 10 wt. % or at least 15 wt. % or at least 20 wt. % or at least 25 wt. % or at least 30 wt. % or at least 35 wt. % or at least 40 wt. % or at least 45 wt. % or at least 50 wt. % or at least 55 wt. % or at least 60 wt. % or at least 65 wt. % or at least 70 wt. % or at least 75 wt. % or at least 80 wt. % or at least 85 wt. % or at least 90 wt. % recycled asphalt shingle waste.

Embodiment 92. The method of embodiment 71, wherein the cores comprise no greater than 99 wt. % recycled asphalt shingle waste or no greater than 98 wt. % or no greater than 97 wt. % or no greater than 96 wt. % or no greater than 95 wt. % recycled asphalt shingle waste.

Embodiment 93. The method of embodiment 71, wherein the cores comprise at least 1 wt. % softening agent or at least 2 wt. % or at least 3 wt. % or at least 4 wt. % or at least 5 wt. % softening agent.

Embodiment 94. The method of embodiment 71, wherein the core comprises no than 30 wt. % softening agent or no greater than 25 wt. % or no greater than 20 wt. % or no greater than 15 wt. % or no greater than 10 wt. %.

Embodiment 95. The method of embodiment 71, wherein the softening agent comprises a petroleum distillate, a Fischer-Tropsch wax, soy wax, zeolites, HDPE, LDPE, EVA, PVC, an emulsifying agent, recycled asphalt pavement, performance grade asphalt, bio-oil, a vegetable oil, biofuel, a biodiesel, Tall-oil, HVGO, FAME, reembodimented motor oil, reembodimented cutting oil, pine tar, a biodiesel residue oil, or a combination thereof.

Embodiment 96. The method of embodiment 71, wherein the softening agent comprises a biodiesel residue oil.

Embodiment 97. The method of embodiment 71, wherein the core comprises a diameter of at least 0.01 in. or at least 0.25 in. and no greater than 2 in. or no greater than 1 in. or no greater than 0.75 in. or no greater than 0.5 in.

Embodiment 98. The method of embodiment 71, wherein the pellet comprises a diameter of at least 0.01 in. or at least 0.5 in. and no greater than 2 in or no greater than 1 in.

Embodiment 99. The method of embodiment 71, wherein the shell composition comprises less than 4 wt. % recycled asphalt shingle waste or less than 3 wt. % or less than 2 wt. % or less than 1 wt. %.

Embodiment 100. The method of embodiment 71, wherein the shell composition is essentially free of recycled asphalt shingle waste.

Embodiment 101. The method of embodiment 71, wherein the shell composition comprises recycled polyethylene, a water-resistant polymer, a wax, mineral fines, or ground plastic fines, or a combination thereof.

Embodiment 102. The method of embodiment 71, wherein the shell composition comprises mineral fines.

Embodiment 103. The method of embodiment 71, wherein the shell composition comprises lime fines.

Embodiment 104. The method of embodiment 71, wherein the shell composition comprises hydrated lime.

Embodiment 105. The method of embodiment 71, wherein the shell composition comprises at least 50 wt. % mineral fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % mineral fines.

Embodiment 106. The method of embodiment 71, wherein the shell composition comprises at least 50 wt. % lime fines or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % lime fines.

Embodiment 107. The method of embodiment 71, wherein the shell composition comprises at least 50 wt. % hydrated lime or at least 55 wt. % or at least 60 wt. % or at least 65 wt. % or at least 70 wt. % or at least 75 wt. % or at least 80 wt. % or at least 85 wt. % or at least 90 wt. % or at least 95 wt. % or at least 97 wt. % hydrated lime.

Embodiment 108. The method of embodiment 71, wherein the shell comprises 10-20 wt. % of each pellet.

Embodiment 109. The method of embodiment 71, wherein the core comprises 80-90 wt. % of each pellet.

Embodiment 110. An asphalt mix comprising the pellets of any one of embodiments 40-70, or a batch of pellets according to any one of embodiments 1-39.

EXAMPLES

Example 1—Airborne Fiberglass

Sample S1 and comparative sample CS1 were prepared according to the following steps having the composition outline in Table 1. Sample CS1 was prepared to correspond to embodiments detailed in U.S. Pat. No. 10,030,338, and related publications.

TABLE 1

| Sample | S1 | CS1 |
|---|---|---|
| Core Composition (80-90%) | | |
| Recycled Asphalt Shingle | 90-95 wt. % | 90-95 wt. % |
| Softening Agent | 5-10 wt. % | 5-10 wt. % |
| Shell Composition | | |
| Recycled Asphalt Shingle | 0-1 wt. % | 59-61 wt. % |
| Hydrated Lime | 99-100 wt. % | 39-41 wt. % |
| Water Resistant Binder Composition | | |
| Water | 47-50 wt. % | 47-50 wt. % |
| Water resistant agent (ZycoTherm) | 0.01-3 wt. % | 0.01-3 wt. % |
| Lignin (Norlig G from LignoTech) | 47-50 wt. % | 47-50 wt. % |

Pellet cores were prepared in a pelletizer disc having the composition detailed above in Table 1. The core materials were pelletized until the cores had a diameter of about 0.25-0.5 in. The softening agent included Bio-Residue Oil from REG. The pellet cores are dusted with a light layer of silica fines in order to prevent sticking. The cores are transported to a second pelletizer disc where the shell composition and water resistant binder composition are applied until the shelled cores have a diameter of about 0.5-1 in.

The pellets are then dried at 140° F. until all of the water in the water resistant binder is evaporated. The final composition of the pellets can be found below in Table 2.

TABLE 2

| Final Pellet Composition | | |
|---|---|---|
| Sample | S1 | CS1 |
| Core Composition (80-90 wt. %) | | |
| Recycled Asphalt Shingle (Core) | 90-95 wt. % | 90-95 wt. % |
| Softening Agent | 5-10 wt. % | 5-10 wt. % |
| Shell Binder Compositions (10-20 wt. %) | | |
| Recycled Asphalt Shingle (Shell) | 0 wt. % | 58-60 wt. % |
| Hydrated Lime | 97-99 wt. % | 38-40 wt. % |
| Water resistant agent (ZycoTherm) | 0.005-0.01 wt. % | 0.005-0.01 wt. % |
| Lignin (Norlig G from LignoTech) | 1-3 wt. % | 1-3 wt. % |

Shelled pellets underwent sieve gradation testing in accordance with AASHTO specifications and the sieve sizes below in Table 3. Results can be found below in Table 3.

TABLE 3

| | Wt. Retained | | % Retained | | % Passing | |
|---|---|---|---|---|---|---|
| Screen Size | S1 Wt. Retained | CS1 Wt. Retained | S1% Retained | CS1% Retained | S1% Passing | CS1% Passing |
| Starting wt. | 2543 | 2377 | | | | |
| ½" | 2 | 3 | 0 | 0 | 100 | 100 |
| ⅜" | 8 | 11 | 0.3 | 0.5 | 99.7 | 99.5 |
| ¼" | 188 | 232 | 7 | 10 | 93 | 90 |
| #4 | 987 | 707 | 39 | 30 | 61 | 70 |
| #8 | 1815 | 1583 | 71 | 67 | 29 | 33 |
| #16 | 2383 | 2105 | 94 | 89 | 6 | 11 |
| #30 | 2514 | 2240 | 94.9 | 94 | 1.1 | 6 |
| #50 | 2529 | 2302 | 99.5 | 96.8 | 0.5 | 3.2 |

TABLE 3-continued

| | Wt. Retained | | % Retained | | % Passing | |
|---|---|---|---|---|---|---|
| Screen Size | S1 Wt. Retained | CS1 Wt. Retained | S1% Retained | CS1% Retained | S1% Passing | CS1% Passing |
| #100 | 2534 | 2332 | 99.7 | 98.1 | 0.3 | 1.9 |
| #200 | 2539 | 2352 | 99.8 | 99.0 | 0.2 | 1.0 |

It was noted that material passing through screen sizes #100 and #200 included extensive fine fiberglass that can cause health or processing issues while the pellets are being worked with. The wt. % of material retained by screen sizes #100 and #200 defines a large fiberglass sieve factor, $F_L$, and a small fiberglass sieve factor, $F_s$, respectively. Notably, sample S1 had 5 times less material passing through the #200 sieve and 6 times less material passing through the #100 sieve as compared to CS1. It was also notable that Sample CS1 produced a number of fiberglass "fur balls" formed from agglomerated fiberglass that would not pass through the smaller sieves unlike the unagglomerated fiberglass.

Example 2—Pavement Grading

Samples 1a and CS1a were prepared according to the following procedure.

RAS was treated with Bio-Residue Oil to form a composition of pretreated RAS including 90-95% wt. % RAS and 5-10 wt. % Bio-Residue Oil. Materials were extracted from the pretreated RAS in accordance with AASHTO T166, Method A. The extracted materials from the sample were then removed from the aliquot by a high-speed centrifuge, the aliquot was then recovered via the Abson Method (AASHTO R59), with sample 1a being the resultant extracted binder. The extracted binder is sample 1a, prepared to correspond to the asphalt properties of the asphalt in Sample 1 from Example 1.

Pre-treated RAS according to the composition above and untreated RAS separately underwent extraction in accordance with AASHTO T166, Method A. The extracted materials from Pre-treated and untreated RAS were then removed from the aliquot by a high-speed centrifuge; the aliquot was then recovered via the Abson Method (AASHTO R59). The extracted pre-treated RAS asphalt was blended with the asphalt extracted from the untreated RAS to form a blend including 88% treated asphalt and 12% untreated asphalt. The extracted binder is sample 1a, prepared to correspond to the asphalt properties of the asphalt in Sample CS1 from Example 1, including both the treated asphalt in the core, and the untreated asphalt in the shell.

Samples 1a and CS1a tested for pavement grading in accordance with AASHTO R29 and AASHTO M320 including accelerated aging under AASHTO R28. The low temperature and high temperature performance grades are indicative of the lowest and highest temperature at which the asphalt compositions can perform as pavement in low traffic conditions without failure. Sample 1a was classified as a PG 82-28 while CS1a was classified as a PG 121-XX.

What is claimed is:

1. A batch of recycled asphalt shingle pellets, each pellet comprising:
    a core comprising a recycled asphalt shingle waste and a softening agent;
    a shell comprising no greater than 5% recycled asphalt shingle waste;
    wherein the batch comprises a large fiberglass sieve factor, $F_L$, of at least 98.2 wt. %.

2. The batch of claim 1, wherein the batch comprises a $F_L$ of no greater than 99.99 wt. %.

3. The batch of claim 1, wherein the batch comprises a low temperature performance grade of no greater than 0° C.

4. The batch of claim 1, wherein the batch comprises a high temperature performance grade of at least 50° C.

5. The batch of claim 1, wherein the shell is essentially free of recycled asphalt shingle waste.

6. The batch of claim 1, wherein the shell comprises mineral fines.

7. The batch of claim 1, wherein the shell comprises hydrated lime.

8. A batch of recycled asphalt shingle pellets, each pellet comprising:
    a core comprising a recycled asphalt shingle waste and a softening agent;
    a shell comprising no greater than 5% recycled asphalt shingle waste;
    wherein the batch comprises a small fiberglass sieve factor, $F_s$, of at least 99.1 wt. %.

9. The batch of claim 8, wherein the batch comprises a $F_L$ of at least 98.2 wt. %.

10. The batch of claim 8, wherein the batch comprises a $F_L$ of no greater than 99.99 wt. %.

11. The batch of claim 8, wherein the batch comprises a $F_S$ of no greater than 99.99 wt. %.

12. The batch of claim 8, wherein the batch comprises a low temperature performance grade of no greater than 0° C.

13. The batch of claim 8, wherein the batch comprises a high temperature performance grade of at least 50° C.

14. The batch of claim 8, wherein the shell is essentially free of recycled asphalt shingle waste.

15. The batch of claim 8, wherein the shell comprises mineral fines.

16. The batch of claim 8, wherein the shell comprises hydrated lime.

17. A method of preparing a batch of asphalt pellets comprising:
    agglomerating recycled asphalt shingle material with a softening agent in a pelletizer to form asphalt pellet cores;
    agglomerating the asphalt pellet cores with a shell composition to form asphalt pellets;
    wherein the asphalt pellet shells comprises no greater than 5% recycled asphalt shingle waste.

18. The method of claim 17, wherein the batch comprises a $F_L$ of at least 98.2 wt. %.

19. The method of claim 17, wherein the batch comprises a $F_S$ of at least 99.1 wt. %.

20. The method of claim 17, wherein the shell composition comprises hydrated lime.

* * * * *